(12) United States Patent
Storm

(10) Patent No.: US 7,193,373 B2
(45) Date of Patent: Mar. 20, 2007

(54) ELECTRONIC BALLAST HAVING A CONVERTER WHICH CAN CONTINUE TO OPERATE IN THE EVENT OF LAMP FAILURE

(75) Inventor: Arwed Storm, Dachau (DE)

(73) Assignee: Patent-Treuhand-Gesellschaft fuer Elektrische gluhlampen MBH, Munich (DE)

(*) Notice: Subject to any disclaimer, the term of this patent is extended or adjusted under 35 U.S.C. 154(b) by 0 days.

(21) Appl. No.: 10/979,198

(22) Filed: Nov. 3, 2004

(65) Prior Publication Data

US 2005/0093486 A1    May 5, 2005

(30) Foreign Application Priority Data

Nov. 5, 2003  (DE)  ............... 103 51 621

(51) Int. Cl.
*G05F 1/00* (2006.01)

(52) U.S. Cl. .................................... 315/291

(58) Field of Classification Search ............... 315/307, 315/291, 224, 149, 150, 240, DIG. 1, DIG. 5
See application file for complete search history.

(56) References Cited

U.S. PATENT DOCUMENTS

| 4,277,728 | A | * | 7/1981 | Stevens | 315/307 |
| 5,598,326 | A | * | 1/1997 | Liu et al. | 363/34 |
| 6,677,716 | B2 | * | 1/2004 | Rudolph et al. | 315/224 |
| 6,690,122 | B2 | | 2/2004 | Weirich | 315/291 |
| 6,833,678 | B2 | * | 12/2004 | Mayer et al. | 315/247 |

FOREIGN PATENT DOCUMENTS

DE  101 10 239  7/2002

* cited by examiner

*Primary Examiner*—Shih-Chao Chen
*Assistant Examiner*—Minh Dieu A
(74) *Attorney, Agent, or Firm*—Carlo S. Bessone

(57) ABSTRACT

The invention relates to an electronic ballast, in which an internal converter S1, S2, C1 continues to operate in the event of a lamp failure. An auxiliary power supply from control circuits can thus be maintained.

12 Claims, 2 Drawing Sheets

ELECTRONIC BALLAST HAVING A CONVERTER WHICH CAN CONTINUE TO OPERATE IN THE EVENT OF LAMP FAILURE

FIELD OF THE INVENTION

This invention relates to an electronic ballast for light-emitting devices, in particular for lamps, or else, for example, for LEDs and LED modules.

BACKGROUND OF THE INVENTION

Electronic ballasts for operating lamps or LEDs and LED modules have long been known and customary. They generally have a converter which operates the light-emitting device and supplies it with power. In addition to so-called self-excited converter concepts, controllers are often used for driving this converter. In the event of a lamp failure, the electronic ballasts are generally switched off automatically for safety reasons.

SUMMARY OF THE INVENTION

The present invention is based on the technical problem of specifying an improved electronic ballast of the type described.

The invention is based on an electronic ballast for a light-emitting device having a converter for supplying power to the light-emitting device, and a controller for controlling the converter, characterized in that the controller is designed to continue to operate the converter in the event of a failure of the light-emitting device, and in the process to convert a low power using losses produced in the ballast.

In addition, the invention is also based on an operating method.

The following description is also based here on the character of the apparatus and of the method of the invention.

The basic idea on which the invention is based is not to disconnect the entire ballast in the event of a failure of the light-emitting device, i.e., for example, of a lamp failure in the form of a filament breakage during operation, or else following unsuccessful or imperfect starting attempts. Rather, the intention is for the converter contained in the ballast to continue to operate at least at a minimum level. In order in this case to prevent the continued operation of the converter resulting in any damages, for example excessive voltages across storage capacitors, in the context of the invention the power converted by the converter must be consumed. For this purpose, losses are intended to be produced in the ballast.

The invention thus makes it possible to maintain specific functions in the ballast and in particular in the controller despite operation of the lamp (which is used below to refer to the light-emitting device without representing a restriction) coming to an end or not being started. In particular, information on the reason for the lamp failure or other essential information held in the ballast can continue to be stored and called up without having to use complex types of memory for this purpose which also contain their information when no current is passing through them. In any case, this applies as long as the system power supply is applied to the ballast. In particular, the situation may thus also be achieved in which the information is stored in the ballast, in particular the controller, that the lamp does not function, and there are thus no new starting attempts. Only when the user turns the power switch off and on again is a new starting attempt undertaken. However, this is only one of the conceivable application possibilities of the invention which in principle offers different possible uses owing to the continued operation of the converter, for example because an auxiliary power supply can be maintained.

In this case, the invention particularly relates to clocked converters having switching transistors. Preferred are ballasts having two-stage converter concepts, i.e. those in which a first converter supplying power to the lamp is supplied with power by a second converter. Preferred in this case as the second converter are so-called power-factor correction circuits which optimize the time characteristic of the power consumption from the power supply system (so-called PFC circuits).

Another preferred refinement of the invention, however, relates to single-stage converter concepts in which an auxiliary power supply can be supplied by the converter itself which continues to operate.

In this case, it is also preferred for, in the event of a lamp failure as described, the two converters to continue to operate at a certain level.

The losses according to the invention in the ballast are preferably switching losses in a switching transistor of the or one of the converter(s), and, specifically, preferably in the first converter supplying power to the lamp.

In one embodiment which is in turn preferred, these switching losses occur by the switching transistor of the converter recharging a so-called trapezoidal capacitor. The term "trapezoidal capacitor" is known to those skilled in the art for a capacitor which is connected in parallel with the switching path of the switching transistor, which contributes to a softer switching behavior owing to recharging processes, and thus actually prevents losses in normal operation. They are so-called commutation aids, which are occasionally also referred to as snubbers.

The converter supplying power to the lamp may be a transistor half-bridge having two switching transistors. In this case, and in principle in the case of a plurality of switching transistors, it is preferred for the mentioned switching losses to be produced alternately in the switching transistors.

In order to produce substantial switching losses, switching preferably takes place according to the invention in the region of the voltage maximum across the relevant switching transistor, it not being absolutely necessary to meet this voltage maximum particularly accurately. For example, it may also be sufficient for switching to take place in the region of at least 80% or preferably 90% of the voltage amplitude. This is referred to here as switching at the voltage maximum.

Furthermore, the switching operations with which the switching losses according to the invention are produced preferably do not take place at the same frequency at which the circuit oscillates in the freewheeling phase (turns the switching transistor(s) off). An integral multiple of the period duration of this natural oscillation is preferably used, this natural oscillation of course being different than the natural frequency when the lamp is running. Preferred are frequency ratios between the factor of 2 and 10, preferably between 4 and 8.

The controller is preferably a microcontroller at least parts of which remain in operation even in the event of a lamp failure owing to a power supply or auxiliary power supply which is provided by the converter which is continuing to operate.

The second converter is preferably an SEPIC converter as a PFC circuit. An important area of application is in ballasts for conventional low-pressure discharge lamps, i.e. so-called fluorescent lamps.

The invention is explained in more detail below with reference to an exemplary embodiment, with it also being possible for the individual features to be significant to the invention in other combinations.

DETAILED DESCRIPTION OF THE INVENTION

Figure 1:
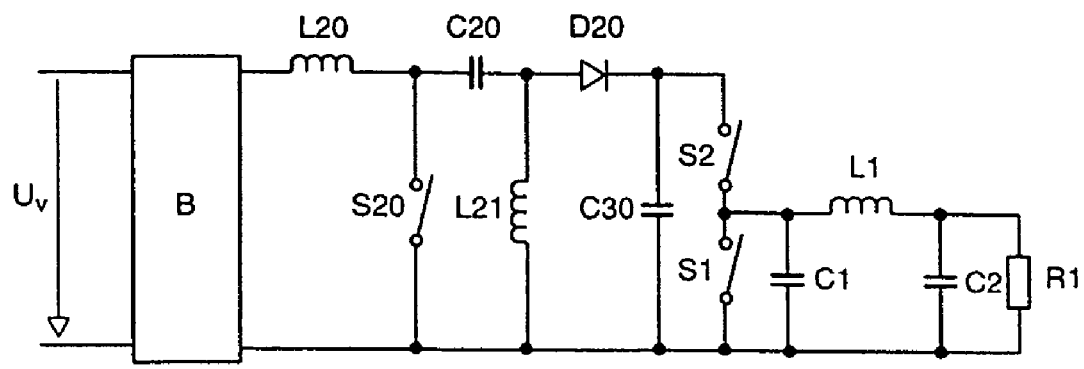
FIG. 1 shows a highly schematic circuit diagram of a ballast according to the invention as the first exemplary embodiment.

FIG. 1 shows a schematic illustration of a ballast according to the invention containing two converters. An SEPIC converter known to those skilled in the art and described, for example, in DE 101 10 239.9 produces an intermediate circuit voltage across a storage capacitor C30, from which a half-bridge circuit having two switching transistors S1 and S2 is supplied.

In the ballast shown in FIG. 1, an AC supply voltage Uv, generally a conventional domestic power supply voltage, is rectified via a bridge rectifier B. There is thus in FIG. 1 a rectified, positive potential on the line branch running horizontally at the top and a rectified, negative potential, which generally represents the reference potential, on the lower line branch parallel thereto. The rectified AC voltage forms the input of the SEPIC converter, which has the inductors L20 and L21, the capacitor C20, the rectifier diode D20 and the switching transistor S20 and is driven by a drive circuit (not shown).

The capacitor C30 acts as a storage capacitor and needs to be charged by the SEPIC converter from the rectified AC voltage to a DC voltage which is as constant as possible. In this case, the intention is for the power consumption from the power supply system to follow the sinusoidal characteristic of the system voltage in a manner which is as interference-free as possible.

Owing to an alternating switching operation of the switching transistor S20, the coil L20 in the switch-on state is charged from the rectified system voltage to a specific current and is discharged in the switch-off state of the switching transistor S20 to the capacitor C20. In the same way, the coil L21 is charged during the switch-on times of the switching transistor S20 and is discharged during the switch-off times to the storage capacitor C20. In this case, the polarity of the diode D20 is to be taken into account. There is so-called noncontinuous operation if the switch-off times of the switching transistor S20 are sufficiently long for the current in the rectifier diode D20 to be reduced to zero. In this case, on average the capacitor C20 remains charged essentially to the value of the instantaneously rectified supply voltage. This in turn results in the storage capacitor C30 being charged during the switch-off times only with the induction voltage produced by the coil L21. Owing to a corresponding duty ratio, i.e. the ratio between the switch-on times and switch-off times, and taking into account the load R31, essentially any desired DC voltage may be set across the capacitor C30 which may in particular be smaller than the amplitude of the system voltage. The SEPIC converter then functions as a step-down converter. The capacitor C20 ensures to a certain extent that the two inductors L20 and L21 are decoupled from one another, with the result that, in contrast to simple step-up converters such as the step-up converter, the voltages produced by the coil L20 do not add up to the instantaneous system voltage.

Connected in parallel with the lower one of the switching transistors S1 and S2 is a trapezoidal capacitor C1 which nevertheless also relieves the load on the upper switching transistor S2 at the same time, i.e. acts as a trapezoidal capacitor for both switching transistors. L1 is the reference given to a conventional lamp inductor, and C2 is the reference given to a conventional resonance capacitor, as are known from the circuitry for low-pressure discharge lamps. The low-pressure discharge lamp itself is not illustrated. It is represented by a resistor R1 connected in parallel with C2. If a discharge lamp is provided as the load, a so-called coupling capacitor must also be connected in series.

The switching transistors S1 and S2 are clocked by a microcontroller MC which likewise clocks the SEPIC converter.

Figure 2:
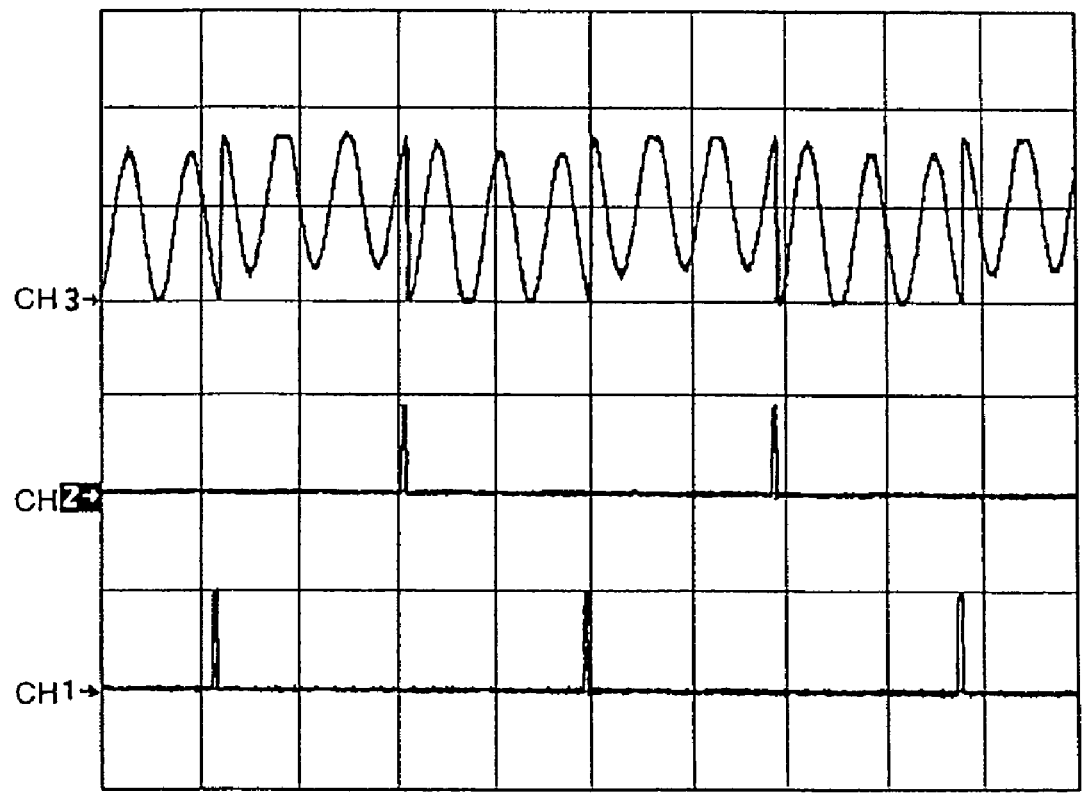
FIG. 2 shows real measurement curves relating to the ballast shown in FIG. 1.

In the event of a lamp failure, for example in the event of an electrode breakage during operation or following unsuccessful starting attempts, the microcontroller continues to operate the SEPIC converter according to the invention, and to be precise at a power level which is as low as possible. This power which is indispensable for the operation of the SEPIC converter would continue to charge the storage capacitor with the intermediate circuit voltage if it is not dissipated. For this reason, the half-bridge oscillator likewise continues to operate according to the invention, but in an operating mode which is different than for normal operation. This is illustrated in FIG. 2. Channel CH1 and channel CH2 each show a drive signal of the upper half-bridge transistor S2 and of the lower half-bridge transistor S1, respectively. Channel CH3 shows the voltage across the center tap of the half-bridge.

The switching transistors are supplied with the control signals specified and are thus each alternately closed for a certain amount of time in the region of the extreme values of the voltage curve (illustrated at the top of FIG. 2) of the center tap of the half-bridge. Whilst one of the switching transistors is closed, the trapezoidal capacitor C1 is recharged, the energy from the trapezoidal capacitor in this case primarily being dissipated in the intrinsic resistance of the switching transistor, i.e., for example, in its drain-source resistance when it is switched on. The charge stored in the capacitor is in this case almost completely reduced by a sufficiently long switch-on time of the switching transistor, i.e., for example, at ten times the critical RC constant, with the result that the energy stored in the capacitor is almost completely dissipated. The total dissipated power is in this case calculated as $$Pv = f \cdot C1 \cdot U^2$$

where
- Pv: Power loss
- f: Switching frequency of the half-bridge in this operating mode
- C1: Capacitance of the trapezoidal capacitor
- U: Voltage step across the trapezoidal capacitor C1.

In this example, it is shown in FIG. 2 that the period duration of the half-bridge operation corresponds to six times the natural frequency of the remaining load circuit, with the result that a switching operation takes place at every sixth extreme point.

The invention thus provides an "emergency operating form" of the ballast, which is possible without additional components, having a PFC circuit (SEPIC converter) which continues to operate and results in power dissipation in the operating mode described of the operated half-bridge. Auxiliary voltages and power supplies derived from the SEPIC converter, for example for the microcontroller, can thus continue to run, and memory contents can be maintained. In particular, it is thus possible to prevent the microcontroller from "forgetting" that a lamp failure has taken place and for this reason continuing to step up and make starting attempts. If, however, the user turns the system switch off and on again, the operating state described here is also interrupted and a new starting attempt is begun.

The invention can be used in principle, for example, also in the case of single-stage converter concepts in which, for example, an auxiliary power supply could be derived from a half-bridge topology. In this case, the half-bridge itself could continue to operate in the described "emergency operating state", in which the microcontroller or another controller continues to be supplied from the half-bridge itself.

Figure 3:
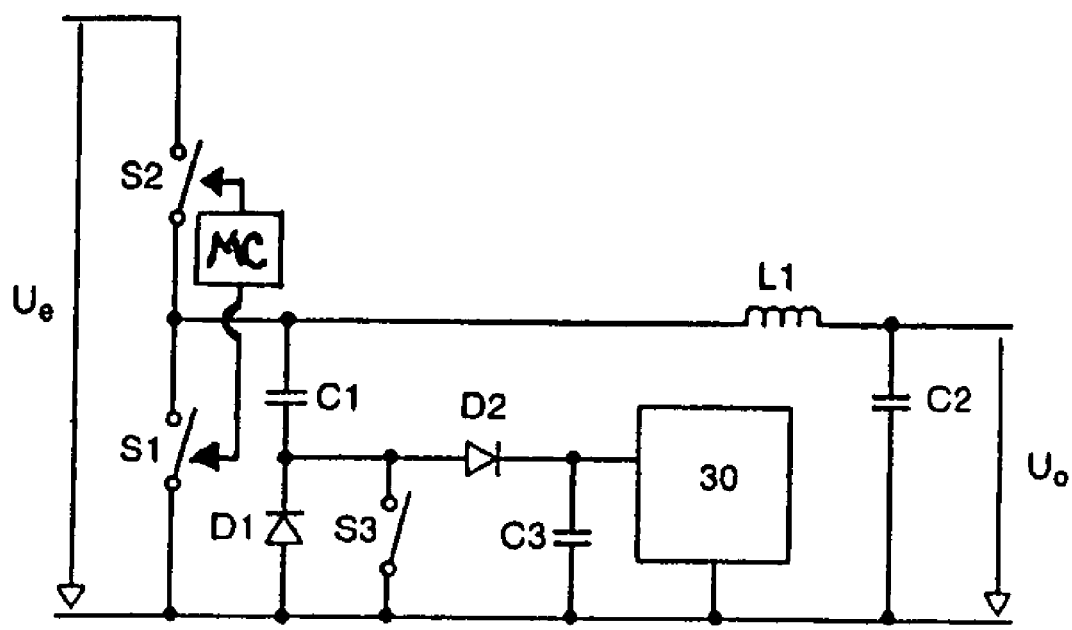
FIG. 3 shows a highly schematic circuit diagram of a ballast according to the invention as the second exemplary embodiment.

A corresponding second exemplary embodiment is shown in FIG. 3. Here, corresponding reference numerals have been used for circuit elements corresponding to the first exemplary embodiment. The input voltage Ue illustrated on the left-hand side could be supplied, for example, by the bridge rectifier B shown in FIG. 1 using additional filters, if necessary. Here, no converter is in any case provided as the PFC circuit. An auxiliary power supply from the recharge current in the trapezoidal capacitor C1 is therefore built up here. This takes place using the diodes D1 and D2, the switch S3 and the backup capacitor C3. The switch S3 is driven for this purpose by means of a two-step controller and thus regulates the voltage across the backup capacitor C3. A circuit 30 to be supplied with power is connected to the backup capacitor C3 and draws the necessary energy for its operation from C3.

Connected in parallel with C2 is an output voltage Uo, to which a load, for example a discharge lamp or an LED, can be connected.

When the lamp is switched off, i.e. when there is no current flowing through L1, the half-bridge S1, S2 can be clocked in the manner already described for the first exemplary embodiment, and the auxiliary voltage supply can thus be maintained.

In this operating mode, the resonant circuit comprising L1 and C2 is not excited.

The invention claimed is:

1. An electronic ballast for a light-emitting device having a converter (S1, S2, C1) for supplying power to the light-emitting device, and
a controller for controlling the converter (S1, S2, C1), characterized in that the controller continues to operate the converter in the event of a failure of the light-emitting device, and in this case converts a low power using losses produced in the ballast, the losses being produced essentially periodically with a period duration which corresponds to an integral multiple, or a multiple with a factor of 2, of the period duration of the natural oscillation (L, C1, C2) occurring in the event of a failure of the light-emitting device.

2. The ballast as claimed in claim 1 having a further, second converter supplying power to said first converter (S1, S2, C1).

3. The ballast as claimed in claim 2, in which the controller is designed to continue to operate the first (S1, S2, C1) and the second converter in the event of a failure of the light-emitting device.

4. The ballast as claimed in claim 2, in which the second converter is an SEPIC converter.

5. The ballast as claimed in claim 1 having a single-stage converter (S1, S2, C1).

6. The ballast as claimed in claim 1, in which the losses are switching losses in a switching transistor (S1, S2) of the converter (S1, S2, C1) which continues to operate.

7. The ballast as claimed in claim 6, in which the switching losses when recharging a trapezoidal capacitor (C1) which is connected in parallel with a switching transistor (S1, S2) of the converter (S1, S2, C1) which continues to operate are switching losses occurring in the switching transistor (S1, S2).

8. The ballast as claimed in claim 1, in which the first converter (S1, S2, C1) is a half-bridge having two switching transistors (S1, S2).

9. The ballast as claimed in claim 1, in which the converter (S1, S2, C1) has a plurality of switching transistors (S1, S2), in which the switching losses are produced alternately.

10. The ballast as claimed in claim 1, in which the switching transistor(s) (S1, S2) is/are largely switched at the voltage maximum in order to produce switching losses.

11. The ballast as claimed in claim 1, in which the controller is a microcontroller, and an auxiliary power supply of the microcontroller is maintained by the converter (S1, S2, C1) continuing to operate.

12. The ballast as claimed in claim 1, which is designed for operating a low-pressure gas discharge lamp.

* * * * *